United States Patent Office 3,645,887
Patented Feb. 29, 1972

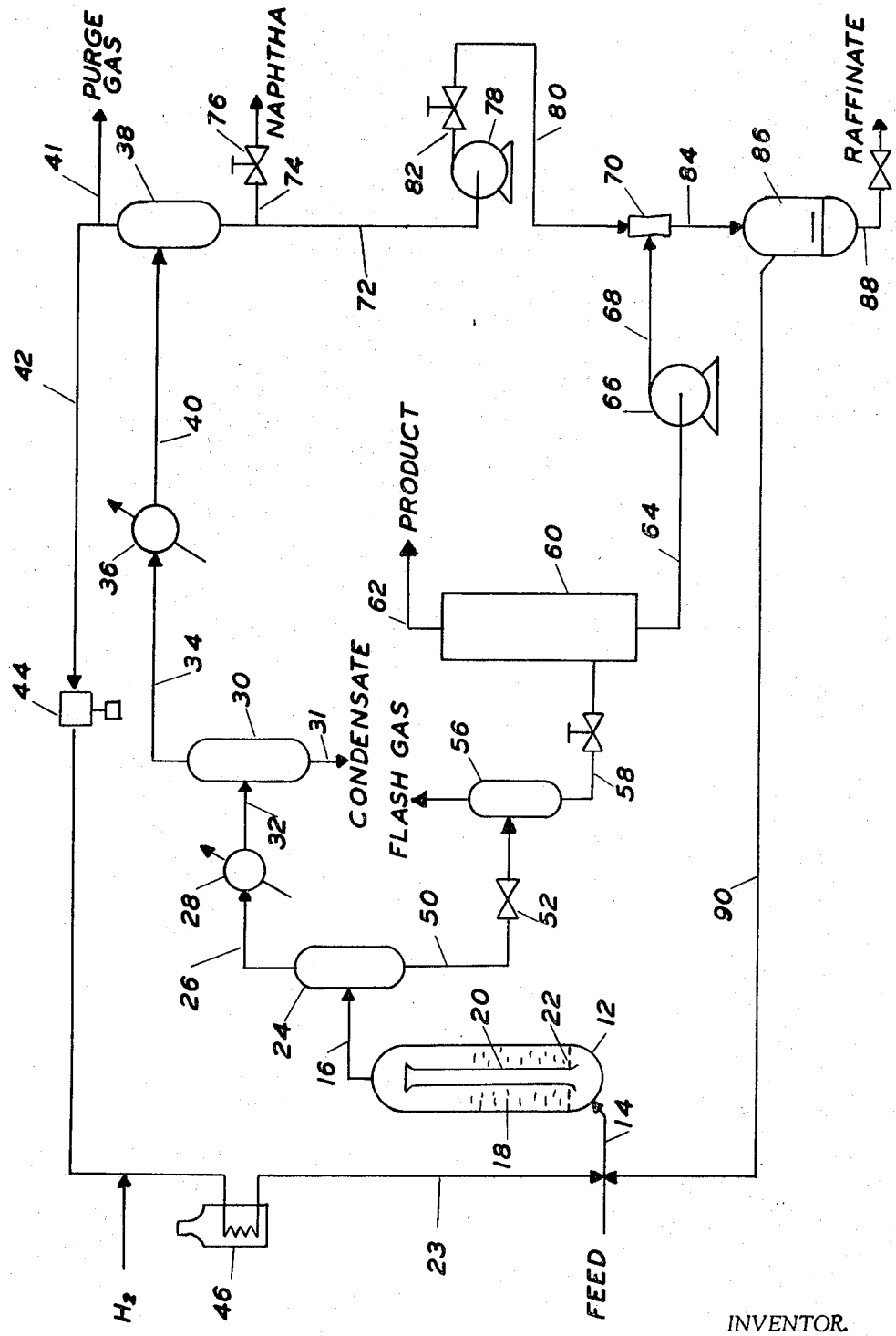

3,645,887
HEAVY OIL HYDROGEN TREATING PROCESS
William R. Mounce, East Windsor Township, N.J., assignor to Cities Service Research and Development Company, New York, N.Y.
Filed Apr. 28, 1970, Ser. No. 29,214
Int. Cl. C10g *13/02, 37/00*
U.S. Cl. 208—96
6 Claims

ABSTRACT OF THE DISCLOSURE

A process for achieving a high conversion of residual heavy oil feedstock is disclosed. The process comprises withdrawing liquid effluent containing unconverted residual oil including thermally degraded material from an ebullated catalyst bed reactor operating at a temperature between about 800° F. and 900° F. and a pressure between 1500 p.s.i.g. and 400 p.s.i.g., mixing the unconverted residual oil with a naphtha stream condensed from reactor vapor effluent, separating the mixture into an extract containing unconverted residual oil miscible in the naphtha and a raffinate containing the thermally degraded material and recycling the extract to the reactor in order to increase the amount of available unconverted residual oil in the liquid phase in the reactor.

BACKGROUND OF THE INVENTION

This invention relates to an improvement in the process of treating heavy hydrocarbon residual oil with hydrogen in the presence of particulate catalyst. More particularly this invention relates to a method for obtaining as high a conversion rate as practical in the hydrocracking of residual oil feedstock where minor proportions of thermally degraded material formed in the reactor, act to limit such conversion ratio.

Heavy hydrocarbon residual oils, such as vacuum and atmospheric residuum from crude petroleum, and crude oil extracted from tar sands and shale oil are presently the subject of many processe for effectively treating such oils to obtain lower boiling oils as well as achieving desulfurization and denitrogenation. Such heavy oils generally have an initial boiling point of above 650° F., a low gravity e.g. of under 20° API at 60° F., and contains at least 30% vol. of material boiling above 975° F. and usually contain relatively large quantities of asphalitic material, sulfur, nitrogen and organo-metallic complexes of high molecular weight.

An effective method of hydrorefining such heavy hydrocarbon oil feedstock includes contacting the oil in the liquid phase with a hydrogen containing gas in the presence of a particulate catalyst bed. The heavy oil is passed upwardly through the bed at sufficient velocity to expand the bed and induce random motion among the catalyst particles. Such an expanded catalyst bed is known as an ebullated bed. The ebullated bed process possesses the distinct advantage of maintaining the reaction zone in a substantially isothermal state and thereby allows the utilization of high uniform temperature while avoiding the presence of hot spots and coking of the catalyst. The ebullated bed hydrogen treatment is conducted at relatively high temperatures and pressures, a temperature of from 800° F. to 900 F. and a pressure of from 2000 p.s.i. to 3000 p.s.i.g. being preferred. A illustrative patent is U.S. Pat. No. Re. 25,770, issued Apr. 27, 1965, to E. S. Johanson for Gas-Lquid Contacting Process, and the method is embodied in a commercially practiced refining process known a the "H-Oil" process.

In order to increase the conversion efficiency of such hydrotreating processes, it is necessary to minimize the amount of thermally degraded material present in the treating zone. With most residual feeds, the formation of degraded material in the reactor acts to limit effective conversion rates to between 60% and 85% of material boiling above 975° F. Above the aforementioned conversion rate, thermally degrade unconverted material tends to separate from the liquid phase and deposit on the catalyst, and on apparatus surfaces generally, including reactor walls, internal structures and piping. This deposition makes the reaction system inoperable. Even at operable reactor conversion rates, wherein the reactor effluent is withdrawn overhead in one stream which is then passed through a shell and tube heat exchanger, it is found that when the naphtha in the vapor phase is condensed the tubes are fouled by a part of the unconverted material which is incompatible with the naphtha and which deposits from the effluent stream on the inside of the tubes.

SUMMARY OF THE INVENTION

Accordingly I have invented an improvement in a process for treating a residual hydrocarbon oil feed, by passing the feed together with hydrogen upwardly through a particulate catalyst bed at a sufficient velocity to expand the bed in a reaction zone. The reaction zone is maintained at a temperature of from 750° F. to 900° F. and at pressures of from 1500 p.s.i. to 4000 p.s.i. Effluent from the reaction zone is separated into liquid and vapor effluent streams at reaction zone conditions of temperature and pressure, and the vapor effluent stream is cooled to condense and separate a stream boiling in the naphtha range. The process comprises separating the liquid effluent stream into a liquid stream boiling approximately below 975° F. and into a bottoms stream containing unconverted material boiling above 975° F., mixing the bottoms stream with a portion of the condensed naphtha stream in the ratio of from 0.5 to 5 parts naphtha to one part bottoms oil, extracting degraded residual material from the bottoms stream by solvent extraction with the naphtha as the solvent, separating the extract from the raffinate, the raffinate including the thermally degraded residual material, and recycling the extract to the reaction zone.

It is therefore an object of this invention to provide a process for increased conversion of heavy residual oils.

Another object of this invention is to provide an improved heavy oil hydrocracking process.

Still another object of the present invention is to provide a hydrocracking process having a reduced tendency to foul and clog catalyst and processing equipment.

Other objects and advantages of the process of this invention will be apparent to those skilled in the art from the description of the drawings and preferred embodiment which follow.

DESCRIPTION OF THE DRAWING

The drawing shows in schematic form the improved process according to the invention.

DESCRIPTION OF THE PREFERRED EMBODIMENT

Referring now to the drawing, a high pressure, high temperature reactor vessel 12 is shown having a feed conduit 14 leading into the bottom of the vessel and an effluent withdrawal conduit 16 exiting from the top of the vessel. The vessel is a suitable cylindrically shaped high pressure reactor vessel enclosing an expanded catalyst bed 18, herein referred to as an ebullated bed, an internally mounted recycle conduit 20 and a one-way grid 22 in the lower portion of the vessel, above which the ebullated bed is established. Temperatures in the reactor vessel are maintained in the range of 750 to 900° F. Pressure is maintained in the range of from 1500 p.s.i.g. to 4000 p.s.i.g. with a range of between 2000 to 3000 p.s.i.g.

preferred. The feed and hydrogen gas is caused to flow upwardly in the vessel at sufficient velocity to expand the catalyst bed up to five times its quiescent volume and to induce random motion in the particulate catalyst. For this purpose, internal recycle utilizing the recycle conduit 20 is preferably employed to establish a suitable liquid velocity in the reactor vessel. The space velocity may vary widely for the purpose of establishing the ebullated catalyst bed. The space velocity, for example may be from 0.2 to 3.0 volumes of reactant per hour, per volume of reactor vessel capacity.

A hydrogen containing gas from a source which will be hereinafter described, is introduced through pipe 23 into feed conduit 14 and into the bottom of the vessel along with the feed. The quantity of hydrogen is on the order of from 2000 standard cubic feet of hydrogen per barrel of fresh feed (s.c.f./b.) to 10,000 s.c.f./b., and more preferably from 3000 to 7000 s.c.f./b. Feed and hydrogen containing gas is introduced at elevated temperatures of from 650° F. to 750° F., these temperatures being achieved with an economical input of energy and heat from outside heat sources such as a fired heater.

The feedstock is any residual type heavy hydrocarbon oil containing an appreciable amount of material boiling above 975° F. Examples of suitable feeds include vacuum and atmospheric residuum from crude petroleum oil, and the crude oil extracted from tar sands and shale oil. The preferred feedstocks generally exhibit an initial boiling point of above 650° F., an API gravity of less than 20° at 60° F., contain at least 30% material boiling above 975° F. and may also contain undesirable quantities of sulfur, nitrogen and organo-metallic complexes of high molecular weight.

Effluent is withdrawn overhead from the reactor vessel 12, via withdrawal conduit 16 and comprises a vapor and liquid mixture under reactor conditions of temperature and pressure. This effluent contains converted hydrocarbons boiling below 975° F., unconverted hydrocarbons including thermally degraded material boiling above 975° F., hydrogen, hydrogen sulfide, and ammonia. The effluent withdrawal conduit 16 is connected to the inlet of a primary vapor-liquid separator 24 which acts to separate the vapor and liquid components at about reactor pressure and temperature. A primary vapor stream is withdrawn from the separator via pipe 26, passed through a primary vapor cooler 28 which appreciably lowers the vapor stream temperature at reactor pressure, to condense most of the hydrocarbon material boiling above 250° F. The cooled primary vapor stream is introduced into a vapor stream condensate separator 30 via pipe 32. The condensate separator 30 is maintained at reactor pressure less pipe and equipment pressure drops, and separates out a full boiling condensate stream boiling in the range of from 250° F. to 975° F. The condensate is withdrawn from the process of this invention through pipe 31 for further treatment or storage, not shown. The vapor stream from the condensate separator 30 is at a relatively low temperature and high pressure and is passed via pipe 34 through another cooler 36 in order to condensate hydrocarbon oil boiling in the C₄-400° F. range and defined herein as naphtha. To achieve this the cooled vapor stream is introduced into a gas-liquid separator 38 via pipe 40 from the cooler 36. The gas-liquid separator 38 is also operated at reactor pressure less pipe and equipment pressures drops. Separated low temperature vapor is withdrawn from the separator via pipe 42 and the side stream is purged via pipe 41 to remove hydrogen sulfide and methane and thereby maintain proper hydrogen purity. The low temperature vapor in pipe 42 comprises a mixed hydrocarbon and hydrogen gas stream suitable for use as the hydrogen gas supply to the reactor vessel 12 and is herein referred to as recycle gas. A compressor 44 is mounted in pipe 42 to bring the recycle gas up to system pressure. After being brought up to system pressure the recycled gas stream is mixed with make-up hydrogen gas and passed to a fired heater 46 to introduce sufficient heat into the hydrogen containing gas stream to maintain the reactor at operating temperature. While the hydrocracking reactions in the reactor vessel are generally exothermic in nature, the feed and the recycle gas have to be heated to a temperature such that the exotherm in the reactor will maintain desired temperatures. The heated recycle gas is returned to the reactor vessel through pipe 23 connected to the feed conduit 14.

The liquid stream from the primary separator 24 is withdrawn through pipe 50, substantially reduced in pressure to a pressure in the range of about 50 to 200 p.s.i.g. by valve 52 which is mounted in pipe 50. After pressure reduction the primary liquid stream is introduced into a flash tank 56 in order to separate the flashed gas from the remaining liquid. The liquid stream from the flash tank 56 is withdrawn via pipe 58 and fed to a vacuum distillation tower 60. The tower 60 is used to separate the liquid feed into a heavy gas oil boiling below about 975° F. and a bottoms fraction having an initial boiling point (IBP) above about 975° F. The bottoms fraction represents the unconverted material boiling above 975° F. include thermally degraded material.

A gas oil product stream consisting of converted oil boiling below 975° F. is withdrawn from the tower overhead via conduit 62 and subjected to further treatment or storage as may be desired. The bottoms are withdrawn from the tower 60 through pipe 64 to a pump 66 and pressurized to approximately reactor pressure. The bottoms stream is pumped from pump 66 through pipe 68 to a mixing zone 70 where it is mixed with naphtha from separator 38 in the amount of from 0.5 to 5 volumes naphtha to one volume of bottoms. The temperature of the mixture is preferably maintained between about 250° F. and 650° F. Intimate mixing of the bottoms and naphtha stream occurs in the mixing zone 70 which may be a length of pipe in which turbulent flow is established by a suitable flow velocity. The turbulent flow insures good mixing and prevents any excessive deposition of thermally degraded material in the mixing zone.

Naphtha is withdrawn from the gas-liquid separator 38 through pipe 72. That portion of the naphtha stream not required for use in the process of this invention is directed via piper 74 and valve 76 mounted therein to storage, or further processing as may be desired. An aliquot portion of the naphtha stream from the gas-liquid separator 38 is fed to the intake of a naphtha pump 78 where the naphtha stream is boosted slightly to reactor system pressure. The naphtha stream is pumped through pipe 80 to the mixing zone 70 where it is mixed with the bottoms stream from distillation tower 60 in the aforementioned volume ratios. Flow control of the pressurized naphtha stream is accomplished by a flow regulating valve 82 mounted in pipe 80. The mixed bottoms and naphtha streams are fed through pipe 84 from the mixing zone 70 to a high pressure separation vessel 86, which separates the mixture into an extract phase wherein the naphtha acts as a solvent, and into a raffinate phase which is substantially insoluable in the naphtha.

The vessel 86 is maintained at or slightly above reactor system pressure and at a mildly elevated temperature, preferably in the range of from 250° to 650° F. The naphtha acts as a solvent for the heavy hydrocarbon oil, principally oil from the bottoms stream boiling above 975° F., but not for the thermally degraded materials that are present. The naphtha stream as previously described is a hydrocarbon stream with a boiling range between 100° F. and 400° F. and is obtained as a condensate from the vapor effluent of the reactor after initial vapor-liquid separation. As a result the material in the separation vessel 86 forms into two separate phases, an extract phase comprising the naphtha with hydrocarbon oil dissolved therein, and a raffinate phase comprising the material which separated out from the mixture. The raffinate is removed from the vessel through a discharge pipe 88 connected to the bottom of the vessel 86 and is used as fuel, blended, or subjected to further treatment outside the scope of this invention. The extract is withdrawn overhead from vessel 86 through an extract conduit 90 and recycled to the reactor vessel 12 together with the feedstock and the hydrogen containing gas. For this purpose the extract conduit 90 is connected at its downstream side to the feed conduit 14. The extract stream contains substantially no thermally degraded material and therefore acts to increase proportionately the amount of residual hydrocarbon oil boiling above 975° F. available for conversion in the reactor vessel 12 without introducing any material which would tend to foul the catalyst and clog apparatus at the high conversion rates desired.

With a view of more fully describing the process according to this invention, the following example is given by way of illustration:

The feedstock is a vacuum residuum which is operable in the conventional ebullated bed process at up to 75% conversion of 975° F. material to lighter products. Above 75% conversion, a conventional prior art process would not be operable.

Ten thousand barrels of the feed per stream day (10,000 b.p.s.d.) of a residual oil comprising 100 vol. percent of material boiling above 975° F. and characterized by a gravity of 10° API and a Ramsbottom Carbon residue of 15 weight percent is introduced into the process of this invention.

Seventy million standard cubic feet per day (70MM s.c.f.d.) of a hydrogen containing gas and 4000 b.p.s.d. of the recycled extract stream containing 62.5 volume percent of naphtha is introduced into the reaction vessel along with the fresh feed. The reaction vessel is maintained at a pressure of 3000 p.s.i.g. and a temperature of 840° F. Effluent from the reactor vessel is introduced into the reactor effluent separator and separated into a liquid stream and a vapor stream.

The vapor stream is subsequently cooled to 350° F. and the condensed liquid is separated at 2970 p.s.i.g. from the vapor as a product stream. The condensed liquid is a relatively full boiling range oil boiling over the range 250° F. to 975° F. and is in the amount of 4900 b.p.s.d. The vapor stream is additionally cooled to a temperature of 100° F. and the condensed liquid separated at 2950 p.s.i.g. as the naphtha stream in the amount of 4600 b.p.s.d., and boiling in the range of $C_4$–400° F. The naphtha stream is divided into a naphtha product stream and a recycle naphtha solvent stream. The naphtha solvent stream, representing 2500 b.p.s.d., is boosted in pressure from 2950 to 3100 p.s.i.g. and mixed with the bottoms stream obtained from the primary separator liquid stream as described below.

The liquid stream from the reactor effluent separator is reduced in pressure from 2990 p.s.i.g. to 150 p.s.i.g. at 840° F. and the flashed vapor is withdrawn after which the remaining flash liquid is subjected to vacuum distillation. The amount of hydrocarbon oil in the 150 p.s.i.g. flash gas is 1500 b.p.s.d. 1000 b.p.s.d. of hydrocarbon oil boiling below 975° F. is removed overhead from the vacuum distillation tower while a bottoms stream comprising 2500 b.p.s.d. of unconverted oil boiling above 975° F. is pumped to 3100 p.s.i.g. and mixed with the naphtha solvent stream.

The mixed stream is fed to a separator vessel maintained at 3020 p.s.i.g. and 350° F. In this vessel contact between the two streams continues and ultimately a separation into two liquid phases occurs. 1000 b.p.s.d. of raffinate, representing the most thermally degraded portion of the unconverted bottoms boiling above 975° F. is withdrawn from the bottom of the vessel 86 as a low value fuel oil or for another use. 4000 b.p.s.d. of extract is withdrawn overhead form the vessel 86 and recycled to the hydrocracking reactor, where the portion boiling above 975° F. undergoes conversion to lighter products.

The naphtha portion of the overhead extract is conveniently flashed into the vapor phase at the high temperature inside the hydrocracking reactor. Since the molecular weight of the naphtha is relatively high compared to hydrogen, it will not greatly lower the hydrogen purity in the reactor vapor phase. In this case, the hydrogen purity would be reduced from 75.0 mol. percent to 73.2 mol percent due to the recycled naphtha.

In this example, by means of the process of this invention, a 90% conversion of the material boiling above 975° F. in the vacuum residuum feed would be achieved on a feedstock where only 75% conversion is conventionally possible.

Having fully described my invention and wishing to cover those modifications and variations which would be readily apparent to those skilled in the art and without departing from either its spirit and scope,

I claim:

1. In a process for the hydrocracking of a residual heavy hydrocarbon feed, said process comprising treating said feed in a reaction zone with hydrogen in the presence of particulate catalyst at a temperature of from 750° F. to 900° F. and a pressure of from 1500 p.s.i. to 4000 p.s.i. to obtain an effluent, the improvement which comprises separating said effluent into primary vapor and liquid stream, said primary liquid stream containing thermally degraded material, cooling said vapor stream to condense a liquid hydrocarbon boiling in the naphtha range, mixing an aliquot portion of said naphtha stream with said primary liquid stream to dissolve heavy oil boiling above 975° F. in the naphtha, said thermally degraded material not being dissolved in the naptha, separating the mixed streams into an extract containing the heavy oil boiling above 975° F. dissolved in the naphtha and a raffinate containing the undissolved thermally degraded material, and recycling the extract as a stream along with the fresh feed to the reaction zone.

2. The process of claim 1 wherein said naphtha stream is characterized by boiling in the range of from about $C_4$ to about 400° F.

3. The process of claim 1 which additionally comprises separating said primary liquid stream into a product stream comprising converted hydrocarbon oil, and into a bottoms stream containing unconverted heavy oil boiling above 975° F. and the thermally degraded material.

4. The process of claim 3 wherein said naphtha stream is in the amount of from 0.5 volumes to 5 volumes per volume of said bottoms stream.

5. The process of claim 4 wherein said step of cooling said vapor stream comprises first cooling said vapor stream to a temperature of about 350° F. at a pressure of from 2000 p.s.i.g. to 3000 p.s.i.g. to condensate liquid boiling in the range of from 250° F. to 975° F., separating said condensed liquid from said cooled vapor stream, and subsequently cooling said cooled vapor stream to a temperature of about 100° F. at a pressure of from 2000 p.s.i.g. to 3000 p.s.i.g. to condense said hydrocarbon liquid boiling in the naphtha range of from $C_4$ to 400° F.

6. In a process for hydrocracking a residual oil feed containing material boiling above 975° F., said process comprising treating said feed with hydrogen by passing the hydrogen and the feed upwardly through an expanded particulate catalyst bed in a reaction zone maintained at a temperature of from about 750° F. to 900° F. and a pressure from about 1500 p.s.i. to 4000 p.s.i. to yield an effluent, the improvement which comprises, separating said effluent into a primary vapor stream and a primary liquid stream, said primary liquid stream containing thermally degraded material, first cooling said primary vapor stream to a temperature of from about 300° F. to about 400° F., at a pressure of from about 2000 p.s.i. to about 3000 p.s.i.

to condense liquid hydrocarbons boiling in the range of from 250° F. to 975° F., separating said condensed liquid from said cooled vapor stream, subsequently cooling said cooled vapor stream to a temperature of about 100° F. at a pressure of from about 2000 p.s.i. to about 3000 p.s.i. which is sufficient to condense a hydrocarbon liquid naphtha boiling in the $C_4$ to 400° F. range, separating said primary liquid stream into a product stream comprising converted hydrocarbon oil, and into a bottoms stream containing unconverted residual oil, and the thermally degraded material, mixing said naphtha and said bottoms stream in the amount of from about 0.5 to about 5 volumes of the naphtha stream per volume of the bottoms stream, separating the mixed streams into an extract containing the naphtha and the unconverted oil boiling above 975° F. and a raffinate containing the undissolved thermally degraded material, and recycling the extract as a stream along with the fresh feed to the reaction zone.

References Cited

UNITED STATES PATENTS

| | | | |
|---|---|---|---|
| 3,549,517 | 12/1970 | Lehman et al. | 208—108 |
| 3,414,505 | 12/1968 | Keith et al. | 208—108 |

HERBERT LEVINE, Primary Examiner

U.S. Cl. X.R.

208—108